(12) United States Patent
Ioka

(10) Patent No.: US 6,558,006 B2
(45) Date of Patent: May 6, 2003

(54) IMAGE PROJECTION DISPLAY APPARATUS USING PLURAL PROJECTORS AND PROJECTED IMAGE COMPENSATION APPARATUS

(75) Inventor: Ken Ioka, Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/927,563

(22) Filed: Aug. 10, 2001

(65) Prior Publication Data

US 2002/0024640 A1 Feb. 28, 2002

(30) Foreign Application Priority Data

Aug. 29, 2000 (JP) .................................... 2000-259427

(51) Int. Cl.[7] .............................................. G03B 21/26
(52) U.S. Cl. ............................................ 353/94; 353/34
(58) Field of Search ............................... 348/745, 744, 348/806; 353/34, 94, 122; 315/368.12

(56) References Cited

U.S. PATENT DOCUMENTS 6,222,593 B1 * 4/2001 Higurashi et al. ..... 315/368.12
6,310,650 B1 * 10/2001 Johnson et al. ............. 348/189
6,346,933 B1 * 2/2002 Lin ............................. 345/157

FOREIGN PATENT DOCUMENTS

JP  06-178327  6/1994
JP  09-326981  12/1997

* cited by examiner

Primary Examiner—Alan A. Mathews
Assistant Examiner—Andrew Sever
(74) Attorney, Agent, or Firm—Straub & Pokotylo; John C. Pokotylo

(57) ABSTRACT

Highly detailed image data from an input terminal is divided by an input image divider in accordance with projectors. The divided image data are subjected to compensation processing by an image compensator, using compensation data for the respective characteristics of the various types of output characteristics. The output characteristics are subjected to compensation processing using the compensation data for the various types of output characteristics stored in the compensation data memory unit. The image data for each projector subjected to compensation processing, after D/A conversion, are sent to respective projectors.

9 Claims, 11 Drawing Sheets

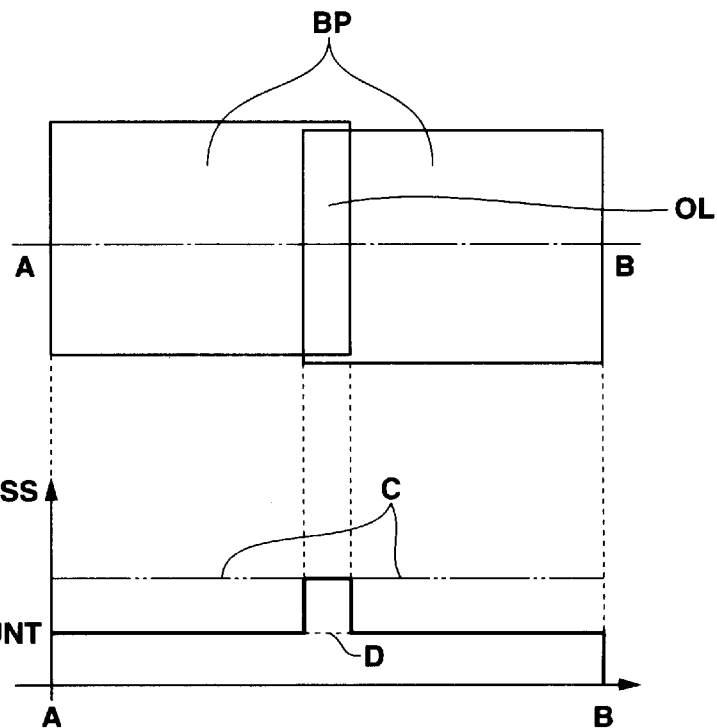
FIG.9A
FIG.9B
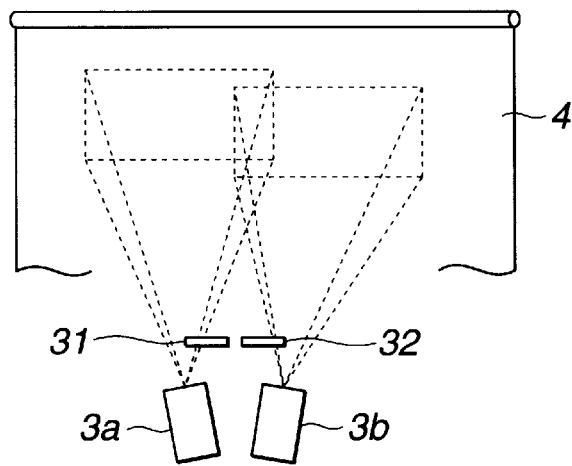
FIG.10

| R | G | B |
|---|---|---|
| (R,G,B) (255, 0, 0) | (R,G,B) (0, 255, 0) | (R,G,B) (0, 0, 255) |
| (R,G,B) (224, 0, 0) | (R,G,B) (0, 224, 0) | (R,G,B) (0, 0, 224) |
| (R,G,B) (192, 0, 0) | (R,G,B) (0, 192, 0) | (R,G,B) (0, 0, 192) |
| (R,G,B) (160, 0, 0) | (R,G,B) (0, 160, 0) | (R,G,B) (0, 0, 160) |
| (R,G,B) (128, 0, 0) | (R,G,B) (0, 128, 0) | (R,G,B) (0, 0, 128) |
| (R,G,B) (96, 0, 0) | (R,G,B) (0, 96, 0) | (R,G,B) (0, 0, 96) |
| (R,G,B) (64, 0, 0) | (R,G,B) (0, 64, 0) | (R,G,B) (0, 0, 64) |
| (R,G,B) (32, 0, 0) | (R,G,B) (0, 32, 0) | (R,G,B) (0, 0, 32) |
| (R,G,B) (0, 0, 0) | (R,G,B) (0, 0, 0) | (R,G,B) (0, 0, 0) |
| ↑ R | ↑ G | ↑ B |

IMAGE PROJECTION DISPLAY APPARATUS USING PLURAL PROJECTORS AND PROJECTED IMAGE COMPENSATION APPARATUS

This application claims benefit of Japanese Application No. 2000-259427 filed on Aug. 29, 2000, the contents of which are incorporated by this reference.

BACKGROUND OF THE INVENTION

1. Field of the Invention

This invention relates to an image projection display apparatus and projected image compensation apparatus, and particularly to an image projection display apparatus and projected image compensation apparatus that use a plurality of projectors to obtain projected images that are seamless, highly detailed, and of high picture quality.

2. Description of the Related Art

In terms of conventional projected image display apparatuses for showing images enlarged on a screen, there are projecting display apparatuses that use a cathode ray tube.

In recent years, moreover, liquid crystal projecting display apparatuses wherein a liquid crystal panel is used as a light bulb have been developed. In such liquid crystal projecting displays, there are those wherewith a video signal is reproduced on a liquid crystal panel which performs a two-dimensional display, light from a light source is modulated by the two-dimensional video reproduced on that liquid crystal panel, and that is then enlarged and projected onto a screen by an optical system.

Meanwhile, conventionally, in order to effect projected images on a large picture screen, there is a multiple-screen projecting display apparatus that employs a plurality of projectors. With this scheme, multiple screens corresponding respectively to the plurality of projectors are arrayed vertically and horizontally to configure a large picture screen. With the multiple-screen projecting display apparatus, however, each screen is provided with a frame, and the boundaries between the screens are conspicuous, which constitutes a shortcoming.

Thereupon, in recent years, image projection systems have been developed wherewith plural projectors are used, and the images of the various projectors are projected lined up on a single screen to display a large picture screen. Such image projection systems include those described in Japanese Patent Unexamined Publication No. H9-326981/1997 (published) and Japanese Patent Unexamined Publication No. H6-178327/1994 (published). In these publications are described methods, such as a method wherewith, when images from a plurality of projectors are projected onto one screen, the adjacent portions of the projected images are made to overlap, and a large picture screen is effected such that the overlapping portions are not conspicuous, and a method for correcting geometric distortion in a projected image resulting from differences in the positions where the projectors are deployed relative to the screen.

Nevertheless, in the methods described in Japanese Patent Unexamined Publication No. H9-326981/1997 (published) and Japanese Patent Unexamined Publication No. H6-178327/1994 (published), noted above, cases where the projection screen is primarily a flat surface are presupposed, and no studies are indicated therein concerning methods for correcting the geometric distortion, color irregularities, or shading that occur when the projection screen used has various curved shapes therein such as arches or domes or the like, or is an irregular surface such as the outer wall of a building.

With an image projection system wherewith, as described in the foregoing, plural projectors are used, and the projector images are projected lined up on one screen to configure and display a large picture screen, cases where the projection screen is primarily a flat surface are presupposed, and there has been a need to investigate methods for correcting the geometric distortion, color irregularities, and shading that occur when the projection screen used has various curved shapes therein such as arches or domes or the like, or is an irregular surface such as the outer wall of a building.

SUMMARY OF THE INVENTION

Thereupon, an object of the present invention, which was devised in view of the problems noted above, is to provide an image projection display apparatus and a projected image correction apparatus which are able, when using a plurality of projectors to effect a seamless large picture screen, to effect projected images of high detail and high picture quality. Another object thereof is to provide an image projection display apparatus and a projected image correction apparatus which can more accurately make compensations for geometric distortion, color irregularities, and shading in projected images, though the projection screen be a surface exhibiting any shape whatever, and which can effect projected images of higher detail and higher picture quality.

The image projection display apparatus of the present invention has: a plurality of projectors; a projection screen functioning as an image-formation surface for the projected images of the plurality of projectors, having mutually overlapping areas; a test image memory unit for storing prescribed test images; an image information capturing unit for capturing projected test images resulting from projecting the prescribed test images by the respective projectors onto the projection screen; a compensation data calculator for calculating, from captured projected test image information, compensation data for correcting the output characteristics of each projector; a compensation data memory unit for storing compensation data; an input image divider for dividing input images in correspondence with each projector; and an image compensator for subjecting input images input to corresponding projectors to compensations, using output characteristic compensation data for each projector.

The above and other objects, features and advantages of the invention will become more clearly understood from the following description referring to the accompanying drawings.

BRIEF DESCRIPTION OF THE DRAWINGS

FIGS. 9A and 9B are diagrams for describing the brightness of overlapping portions and correcting that brightness using light interrupting panels;

FIG. 10 is a diagram for describing a method for correcting the brightness of overlapping portions using a light interrupting panel;

FIG. 11 is a diagram of gamma measuring test images for various colors;

Figure 14:
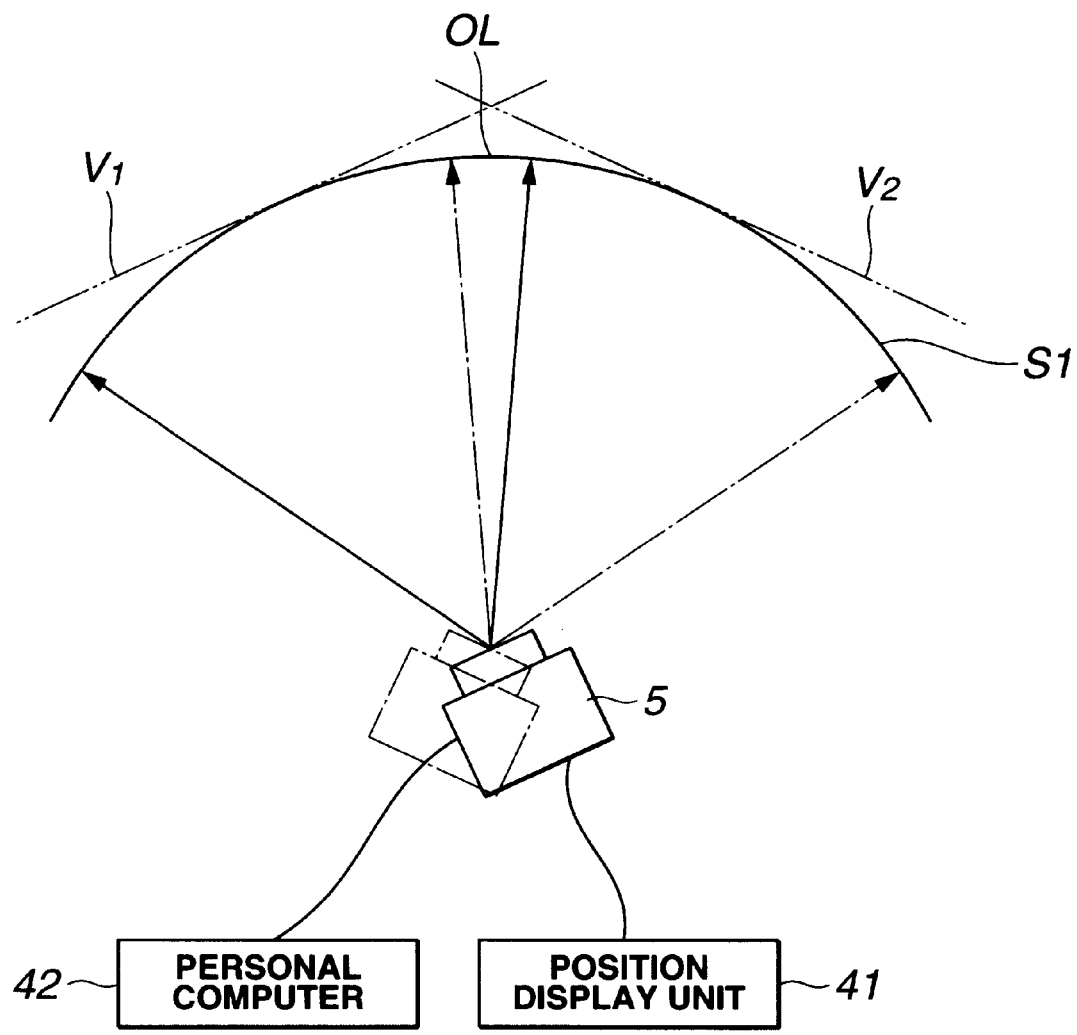
Figure 15:
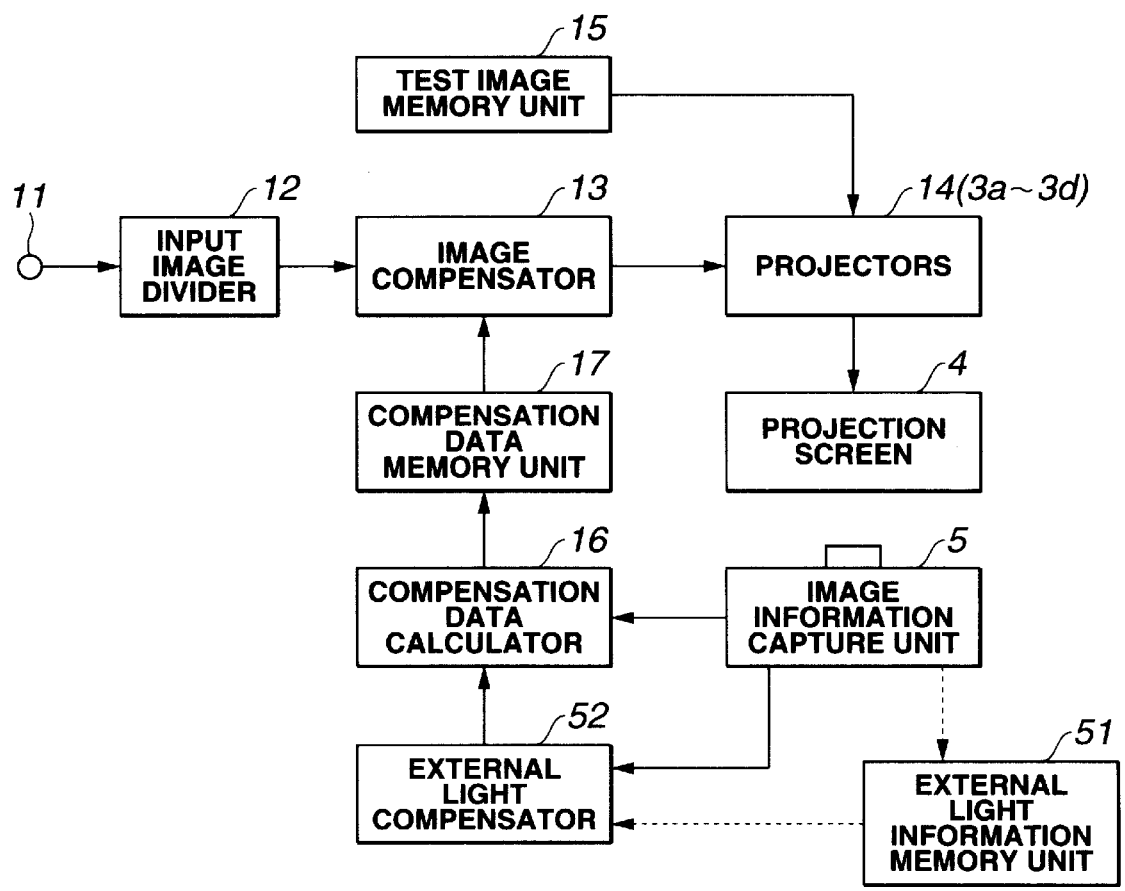
Figure 16:
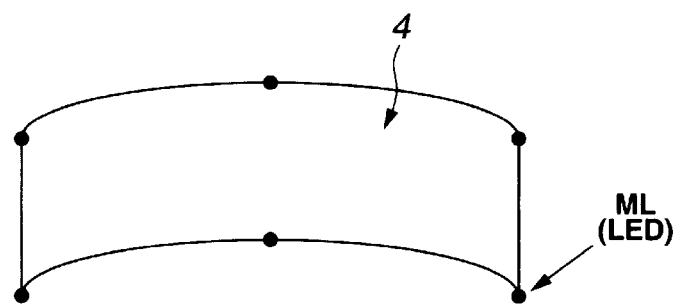
Figure 17:
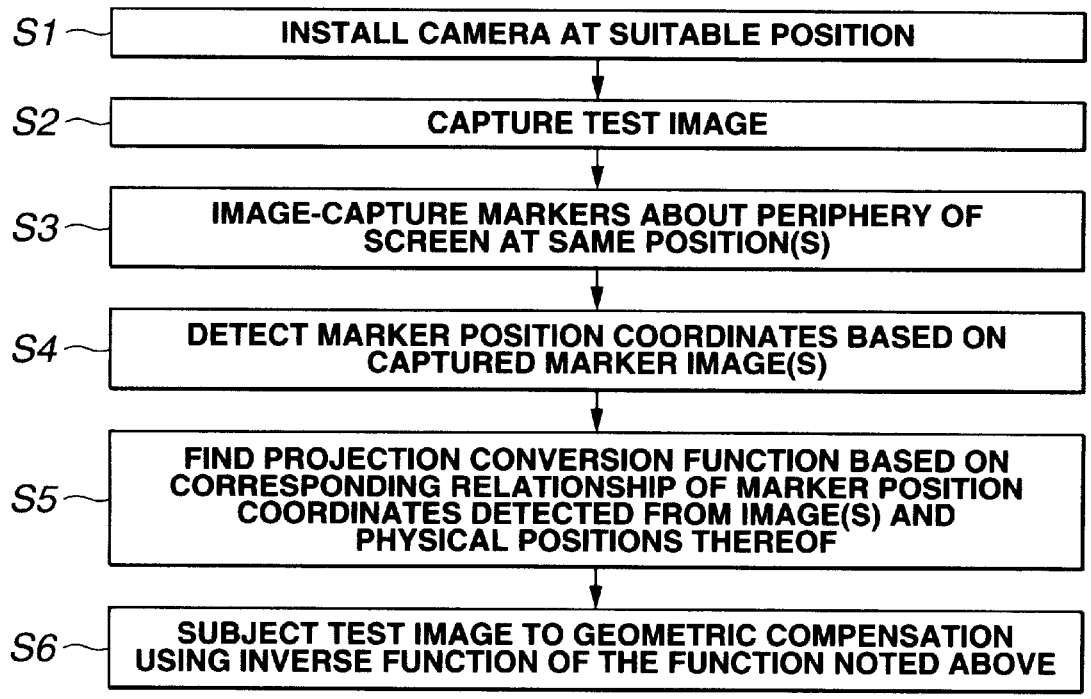
Figure 18:
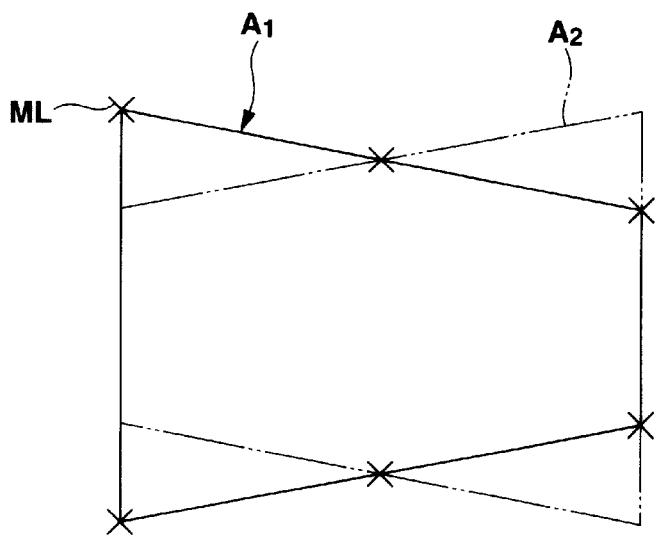

Formula 1 is a diagram representing a geometric deformation function useful in projecting from a flat surface to a flat surface;

Formula 2 is a diagram representing a geometric deformation function useful in projecting from a flat surface to a curved surface;

FIG. 14 is a diagram representing a method for divisionally capturing a test image projected onto a curved surface screen;

FIG. 15 is a block diagram of an image projection display screen in another embodiment aspect of the present invention;

FIG. 16 is a diagram representing markers deployed on a projection screen for the purpose of compensating for geometric deformation caused by discrepancies between camera positions;

FIG. 17 is a flowchart for describing a method for making compensations in a test image projected with geometric deformation based on discrepancies in the positions of the cameras used in capturing the images, by referencing markers on the screen; and FIG. 18 is a diagram for describing the compensation method of FIG. 17.

DESCRIPTION OF THE PREFERRED EMBODIMENTS

Embodiment aspects of the present invention are now described with reference to the drawings.

Figure 1:
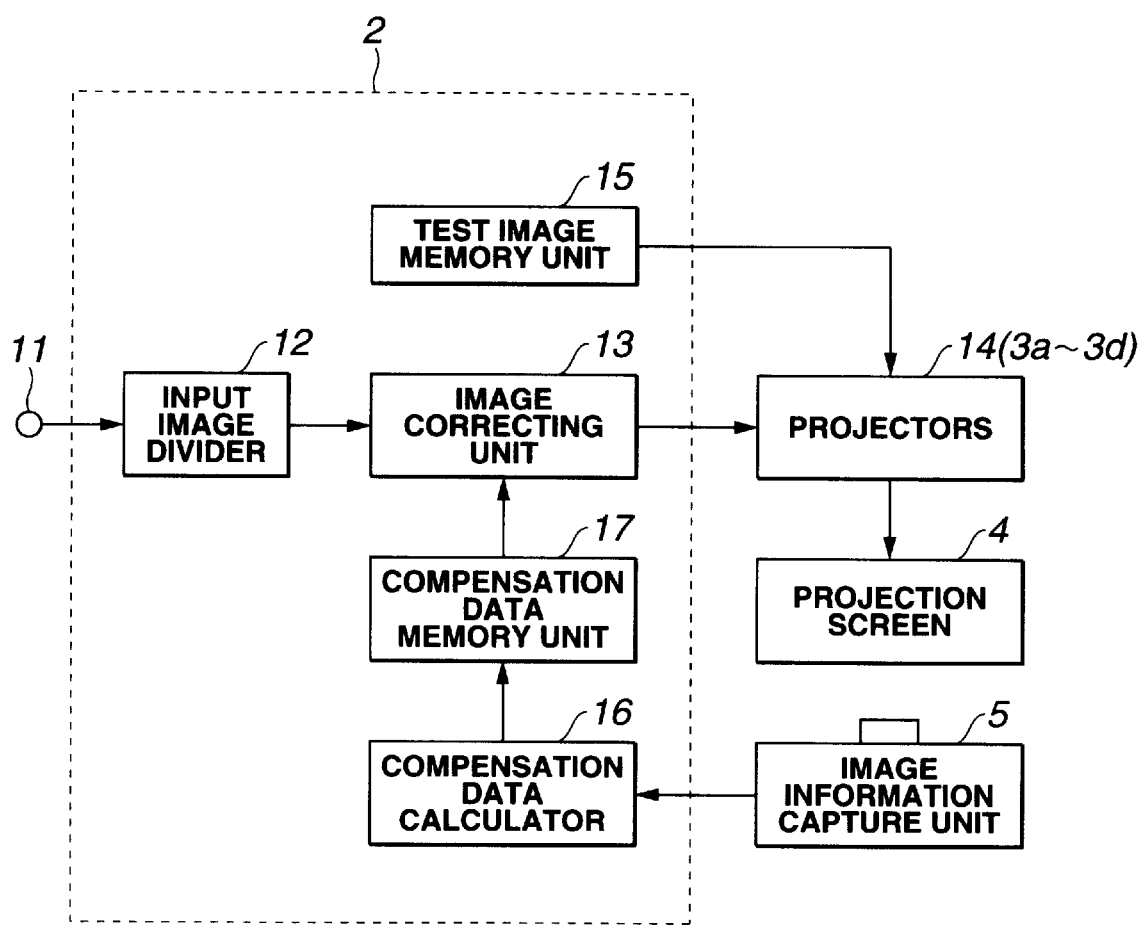
FIG. 1 is a block diagram of an image projection display apparatus in one embodiment aspect of the present invention.
Figure 2:
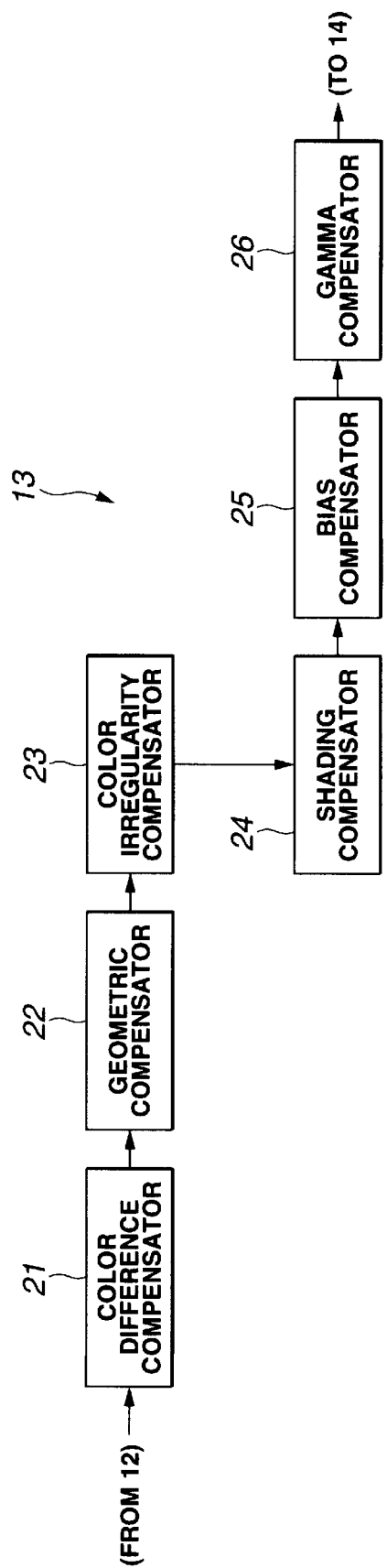
FIG. 2 is a block diagram representing the configuration of the image compensator in FIG. 1.
Figure 3:
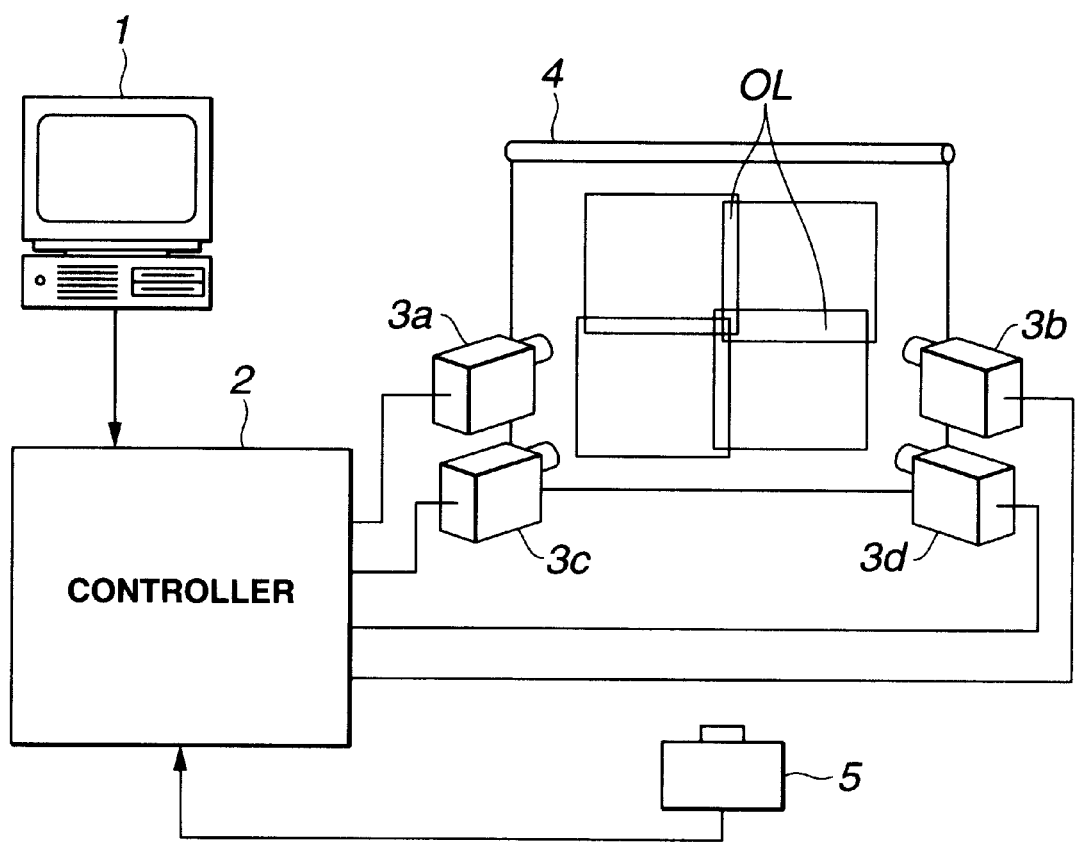
FIG. 3 is a simplified configurational diagram of an image projection system relating to the present invention.

Before describing the configuration of the main parts of an image projection display apparatus in a first embodiment aspect of the present invention using FIG. 1 and FIG. 2, a simplified configurational description of the image projection display apparatus relating to the present invention is given, making reference to FIG. 3.

As diagrammed in FIG. 3, the image projection system relating to this embodiment aspect is configured, in terms of its larger divisions, by a personal computer (hereinafter abbreviated PC) 1 functioning as an image generator for generating highly detailed images, a controller 2, a plurality of projectors 3a to 3d, and an image information capture unit 5, such as a digital camera, for capturing test images and the like projected on a screen 4. The controller 2 processes and divides highly detailed image data from the PC 1 in correspondence with the plurality of projectors used, and makes compensations in the divided outputs for geometric distortion, color irregularity, and shading, etc., based on images obtained by capturing the projected screen images. Either liquid crystal projectors or projectors employing digital light processing (abbreviated DLP, a digital video technology built around the digital micromirror device (DMD), which is an optical semiconductor) are used for the projectors 3a to 3d.

In such a configuration as this, the highly detailed image data produced and output by the PC 1 are output to the controller 2. In the controller 2, which portion of the highly detailed image data to output to each projector is determined, and processing is performed on the projector images, using the compensation data, to correct the geometric distortion, and irregularities in color and brightness and the like. The compensation data necessary for correcting the projected images of the projectors and making compensations between the projected images made by the projectors, are produced on the basis of captured image data obtained beforehand by projecting test images from the projectors onto the screen 4, and capturing those projected images with an image information capture camera 5. The compensation data calculation method is described subsequently.

In FIG. 1 is given a block diagram of the image projection display apparatus of an embodiment aspect of the present invention. Parts that are the same as in FIG. 3 are designated by the same symbols and described accordingly.

The image projection display apparatus diagrammed in FIG. 1 is configured so as to have an input terminal 11 to which highly detailed image data from a PC for example are input, a projector unit 14 comprising a plurality of projectors (3a to 3d), an input image divider 12 for dividing the input images in correspondence with the projectors, an image compensator 13 for compensating images input to corresponding projectors, using the various types of output characteristic compensation data for the respective projectors, a projection screen 4 functioning as an image-formation surface for the projected images from the plurality of projectors, having mutually overlapping areas, a test image memory unit 15 for storing prescribed test images, an image information capture unit 5 for capturing projected images resulting from projecting the prescribed test images by the respective projectors, a compensation data calculator 16 for calculating, from captured information, compensation data for correcting various types of output characteristics of the projectors, and a compensation data memory unit 17 for storing those compensation data.

In this embodiment aspect, moreover, a projected image compensation apparatus comprises a test image memory unit 15, an image information capture unit 5, a compensation data calculator 16, a compensation data memory unit 17, an image compensator 13, and an input image divider 12.

In such a configuration as this, the highly detailed image data input at the input terminal 11 are divided in correspondence with the projectors by the input image divider 12. The image data divided in correspondence with the projectors are subjected to compensation processing by the image compensator 13, using compensation data for the respective characteristics of the various types of output characteristics. The image compensator 13 is configured so as to comprise all of the compensation units, or at least one or more of those compensation units, as diagrammed in FIG. 2, namely a color difference compensator 21, geometric compensator 22, color irregularity compensator 23, shading compensator 24, bias compensator 25, and gamma compensator 26. This image compensator 13 performs compensation processing (color difference compensation, geometric compensation, color irregularity compensation, shading compensation, bias compensation, and gamma compensation, that is, either all of these compensations, or at least one or more of these compensations), on the output characteristics using the compensation data for the various types of output characteristics stored in the compensation data memory unit 17. The image data subjected to compensation processing for each projector is also converted to analog signals by a D/A converter (not shown) and then sent to each of the respective projectors (3a to 3d) in the projector unit 14. Thereupon, the projector images are projected onto the screen 4 by the projectors (3a to 3d).

The test image memory unit 15 stores test images prepared for each of the various types of projector output characteristics. The compensation data for the various types of output characteristics noted earlier are obtained by projecting test images onto the screen 4 for each of the various types of output characteristics read out from the test image memory unit 15, capturing the projected test images with the image information capture unit 5, which is a digital camera or the like, and calculating from the projected image data either a compensation amount or a compensation function for each of the various kinds of output characteristics, by the compensation data calculator 16. Then the calculated compensation amounts or compensation functions are stored as compensation data in the compensation data memory unit 17. The method of calculating the compensation data in the compensation data calculator 16 is different for each type of output characteristic to be compensated.

Figure 4A:
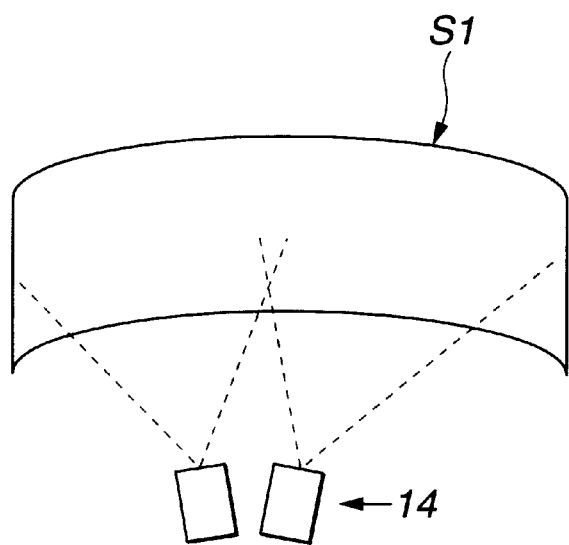
FIG. 4A is a diagram representing the curved shape of an arching screen in FIG. 1.
Figure 4B:
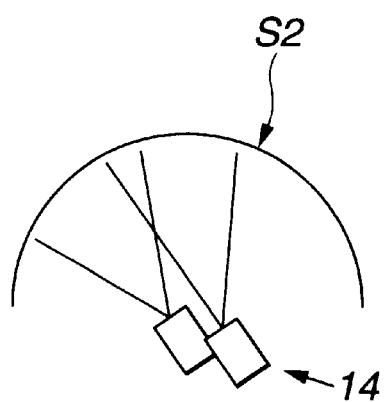
FIG. 4B is a diagram representing the curved shape of a dome screen in FIG. 1.

The projection screen 4 may be, besides a flat screen, a cylindrical surface type (called arching) screen S1, as diagrammed in FIG. 4A, a spherical surface type (called dome) screen S2, as diagrammed in FIG. 4B, or any desired surface, including irregular surfaces and the like.

The test images stored in the test image memory unit 15 are configured of at least one kind of images in a group made up of the following: an image for measuring the amount of geometric deformation in images projected from the projectors, an image for measuring color differences in images projected between projectors, an image for measuring the degree of color irregularity inside the surfaces of images projected from a projector, an image for measuring the degree of brightness irregularity (called shading) inside the surfaces of images projected from a projector, an image for measuring bias in images projected by a projector (when a black signal is input for which the input signal is at the 0 level, the projected image does not become black, but exhibits a brightness (so-called offset), and it is that offset amount which is measured), and an image for measuring the status of the gamma characteristic which is an input/output characteristic of each projector.

The image information capture unit 5 is configured so as to comprise either both or at least one or other of a camera such as a digital camera for capturing projected test images, and color measurement means such as a colorimeter or spectrometer for measuring color information (color differences). A camera is used for measuring two-dimensional color irregularities in projector projection surfaces and such geometric positional information as markers deployed in test images, but color measurement means such as a colorimeter are used for measuring color differences between projectors. Accordingly, if the color levels of the various colors are roughly matched between a plurality of projectors, there will be cases where it is not necessary to compensate for color differences, in which cases it will suffice to have only a camera for the image information capture unit 5.

Descriptions are given next of test images and of various types of output characteristics based thereon, making reference to FIG. 5A to FIG. 9B. Descriptions are given of (1) geometric deformation compensation, (2) color irregularity compensation, (3) color difference compensation, (4) shading compensation, (5) bias compensation, and (6) gamma compensation.

(1) Geometric Deformation Compensation

Figure 5A:
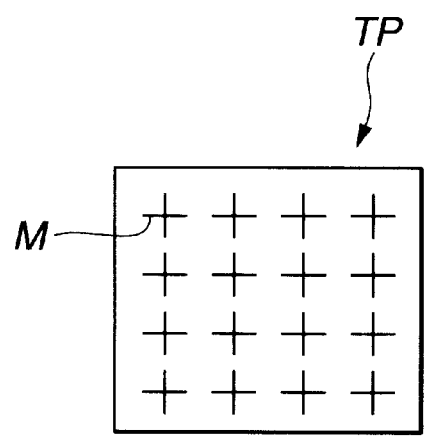
FIG. 5A is a diagram representing a geometric deformation measuring test image.
Figure 5B:
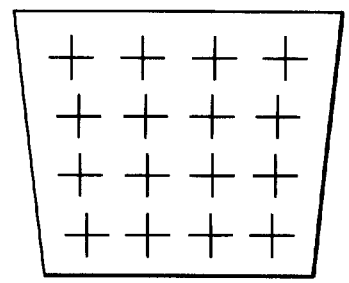
FIG. 5B is a diagram of an example of an image resulting from projecting the test image diagrammed in FIG. 5A onto a projection screen.

For an image for measuring geometric deformation, used are crosses or bright spots lined up at certain intervals, or lattice patterns or the like, for example. In FIG. 5A is diagrammed a test image TP wherein multiple crosses are aligned as markers M. In FIG. 5B is diagrammed an example of a geometrically deformed test image formed by projecting the test image TP diagrammed in FIG. 5A onto the projection screen 4. Such geometric deformation in projected test images is an effect which occurs when, after installing a plurality of projectors 3a to 3b relative to a screen 4 (See; FIG. 3), the projectors do not squarely face the screen surface (that is, more accurately stated, the liquid crystal panels inside the projectors do not squarely face the screen).

First, with the image information capture unit 5 comprising a digital camera, the projected test image diagrammed in FIG. 5B is captured, and the resulting image data are sent to the compensation data calculator 16. Then, in the compensation data calculator 16, a geometric deformation function is derived for each projected image of the projectors, from the correspondence relationship between the marker positions in the test images stored in the test image memory unit 15 and the positions of the markers inside the test images captured by the camera 5, and those geometric deformation functions are stored as compensation data in the compensation data memory unit 17. Then the geometric compensator 22 in the image compensator 13 (See; FIG. 2), using the geometric deformation functions from the compensation data memory unit 17, applies geometric compensations (reverse deformations) to the input image data (See; FIG. 5(a)) for each projector from the input image divider 12, and outputs those geometrically compensated image data to the respective corresponding projectors 3a to 3b. As a consequence, the images projected toward the screen 4 from the projectors 3a to 3b will be displayed as images compensated for geometric deformation, even though the projectors do not squarely face the screen surface.

Furthermore, in order to derive the geometric deformation functions from the correspondence relationship between FIG. 5A and FIG. 5B, as noted above, the case is assumed (presupposed) where the projectors are liquid crystal projectors having liquid crystal panels, for example, which are flat-surface light bulbs, and flat images are projected from the liquid crystal projectors onto a flat screen.

(2) Color Irregularity Compensation

Figure 6A:
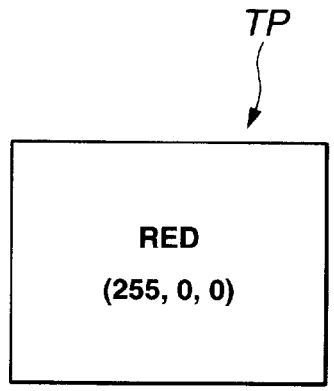
FIGS. 6A, 6B, and 6C, respectively, are showing measuring test image of red, green, and blue color irregularity and color difference.
Figure 6B:
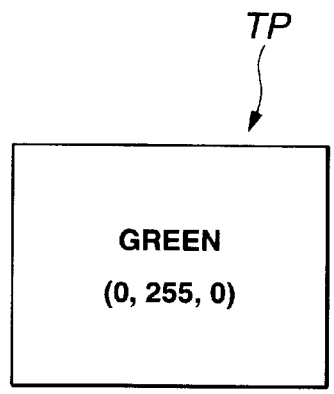
Figure 6C:
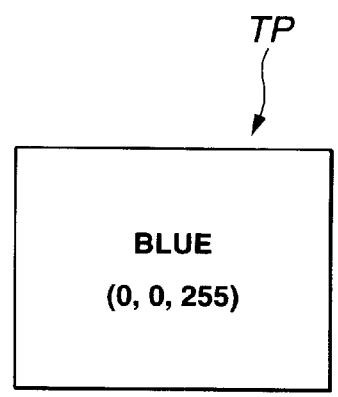

For the test images for measuring color irregularity and color difference, used is test images TP having the highest tone levels for the colors red (255, 0, 0), green (0, 255, 0), and blue (0, 0, 255), as diagrammed in FIGS. 6A to 6C, for example. When each color is expressed in an 8-bit digital signal, each color has 256 tones, of tone levels from 0 to 255. The compensation of color irregularity inside projector projection surfaces is performed by the color irregularity compensator 23 in the image compensator 13 (See; FIG. 2).

In order to compensate color irregularity inside projector projection surface, first, images at the highest tone levels indicated in FIG. 6 in the order of red (R), green (G), and blue (B) for one projector are sequentially projected onto the screen 4, and those respective projected test images are sequentially captured by the camera functioning as the image information capture unit 5. Ratios are then taken between the R, G, and B data for those captured R, G, and B images and the R, G, and B data for the images at the same positions corresponding respectively thereto (that is, at the same positions on the projection surface). Then, if the ratios for the R, G, and B data are different, depending on the pixel position, when compared against the ratios of the R, G, and B data for the position in the center of the projection surface, for example, as a reference, compensation data are generated to make those R, G, and B ratios become the same at all pixel positions in the projector projection surface. Using these compensation data so obtained, compensations are then applied to the input signals, and thereby color irregularity is compensated.

(3) Color Difference Compensation

Color difference compensation between projectors is performed by the color difference compensator 21 in the image compensator 13 (See; FIG. 2).

In order to compensate color differences between projectors, test images TP at the highest tone levels indicated in FIGS. 6A to 6C in the order of red (R), green (G), and blue (B) for a plurality of projectors are sequentially projected onto the screen 4, and those respective projected test images are sequentially captured by a colorimeter functioning as the image information capture unit 5. Then, a compensation matrix is made for each projector such that the XYZ values for the position in the center of the projection surface for all of the projectors become the same. The compensation matrixes so obtained are then used to apply compensations to the input signals.

These compensations make the tristimulus values XYZ at the center position in the projection surface for each of the plurality of projectors become the same value. In this manner, if the compensation for color irregularities in the projector projection surface described in the foregoing is next performed around each center position in the projector projection surfaces, then both inter-projector color difference compensation and compensation for color irregularities in the projector projection surfaces can be accomplished.

(4) Shading Compensation

Figure 7:
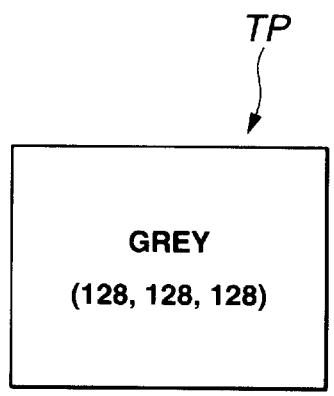
FIG. 7 is a diagram of a shading measuring test image.

For the test image for measuring shading, used is an image wherein the R, G, and B color tone levels are the intermediate level, that is, a gray (128, 128, 128) image, as diagrammed in FIG. 7, for example. The reason for using such an image of intermediate tone is that, whereas human sensitivity to changes in brightness is low when it is either very bright or very dark, the sensitivity is acute with respect to changes of brightness of intermediate tones. Compensation for shading (brightness irregularity) in projector projection surfaces is performed by the shading compensator 24 in the image compensator 13 (See; FIG. 2).

In order to compensate for shading (brightness irregularity) in the projector projection surfaces, first, the test image TP of intermediate tone noted above and diagrammed in FIG. 7 is projected with one projector onto the screen 4, and that projected test image is captured by a camera functioning as the image information capture unit 5. If the pixel data corresponding to all of the pixel positions other than the projection surface center position in the captured image on the projection surface differ from the pixel data at the projection surface center position, taken as reference, for example, compensation data are generated such that those data for all pixel positions other than the projection surface center position will become the same as the pixel data for the projection surface center position. Shading compensation is performed by applying compensations to the input signals, using the compensation data so obtained.

(5) Bias Compensation

Figure 8:
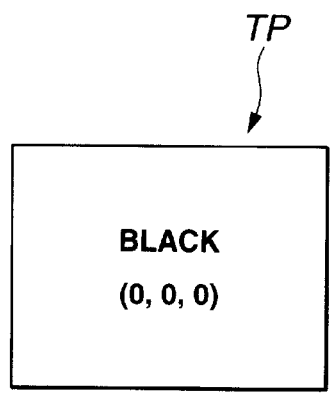
FIG. 8 is a diagram of a bias measuring test image.

For the test image for measuring bias, used is an image wherein the R, G, and B color tone levels are at the lowest level, that is, a black (0, 0, 0) image, as diagrammed in FIG. 8, for example. Compensation for bias in projector projected images is performed by the bias compensator 25 in the image compensator 13 (See; FIG. 2).

What is meant by bias in a projector projected image is that, when a test image TP at the lowest tone level (that is, a black image, as noted earlier and diagrammed in FIG. 8 for one projector) is projected onto the screen 4, and that projected test image is captured by a camera functioning as the image information capture unit 5, the projected image does not become black but has brightness (so-called offset). That offset is such that the input image is made the lowest level image (0, 0, 0), wherefore it is impossible to compensate so as to further lower the input image level.

When, on the other hand, images from a plurality of projectors are projected so as to overlap on the screen 4, as diagrammed in FIG. 3, an overlapping portion OL or portions will develop. In that case, if the signal levels input to two projectors 3a and 3b are both put at the black level (0, 0, 0), for example, black images BP will overlap on the screen, as diagrammed in FIG. 9A, and the brightness of the overlapping portion OL based on the offset of the projectors 3a and 3b, as indicated by the solid line in FIG. 9B, will become a brightness for which the offset amount has doubled. Nevertheless, it is impossible to make compensation that lowers the input signal level any further than this, even if an attempt is made to lower the input image signals of the projectors to lower the brightness of the overlapping portion OL.

Now, there are two methods for compensating the brightness of the overlapping portion based on the offset of the projectors. With the first method, because the input signals for the overlapping portion OL cannot be made 0, by conversely raising the brightness of the portions other than that overlapping portion OL, and making them of equivalent brightness with that overlapping portion OL (indicated by the double-dotted broken line C in FIG. 9B), the brightness is made flat over the entire projection area produced by the plurality of projectors.

In order to compensate bias in the total projection area of a plurality of projectors with this first method, the black level test image diagrammed in FIG. 8 is projected onto the screen 4 for one projector, that projected test image is captured with a camera functioning as the image information capture unit 5, and the captured image data are stored in memory in the compensation data calculator 16. Next, similarly, the black level test image is projected onto the screen 4 for another projector, that projected image is captured by the image information capture unit 5, and those captured image data are stored in memory in the compensation data calculator 16. Then, by calculating, in the compensation data calculator 16, the brightness of the overlapping portion OL, compensation data are generated wherewith to make the level of brightness in the portions other than the overlapping portion OL in the projected images of the projectors the same as the level of brightness in the overlapping portion OL. Bias compensation is performed by applying compensations to the input signals using the compensation data so obtained. With this method, however, although unevenness in brightness based on the offset is eliminated, a difficulty remains in that even though an input image be black, it will not show as completely black because the offset is not eliminated.

With the second method, the light path corresponding to the overlapping portion or portions of images projected from a plurality of projectors is physically interrupted. Specifically, as diagrammed in FIG. 10, light interrupting panels 31 and 32 are deployed in the light paths of images projected through the projection lenses of the projectors 3a and 3b, thus diminishing the light amount in the overlapping portion OL (indicated by the dotted line D in FIG. 9B), and compensating the offset when the color is black (effecting flat characteristics).

(6) Gamma Compensation

For the gamma measuring test images for measuring the gamma characteristics that are input/output characteristics of projectors, there are, as diagrammed in FIG. 11, for example, a plural number (9 each in FIG. 11) of test images TP wherein the tone levels for the colors R, G, and B are gradually raised. More specifically: for R, test images are used wherein the tone level is raised 32 levels at a time, within the 256 tones, i.e. (0, 0, 0), (32, 0, 0), . . . , (224, 0, 0), (255, 0, 0); for G, test images are used wherein the tone level is raised 32 levels at a time, i.e. (0, 0, 0), (0, 32, 0), . . . , (0, 224, 0), (0, 255, 0); and for B, test images are used wherein the tone level is raised 32 levels at a time, i.e. (0, 0, 0), (0, 0, 32), . . . , (0, 0, 224), (0, 0, 255). Gamma characteristic compensation for the projectors is performed by the gamma compensator 26 in the image compensator 13 (cf. FIG. 2). In theory, the output of the projected images can be compensated by applying reverse gamma characteristics (characteristics that are the opposite of the gamma characteristics measured) to the input signals going to the projectors.

Figure 12:
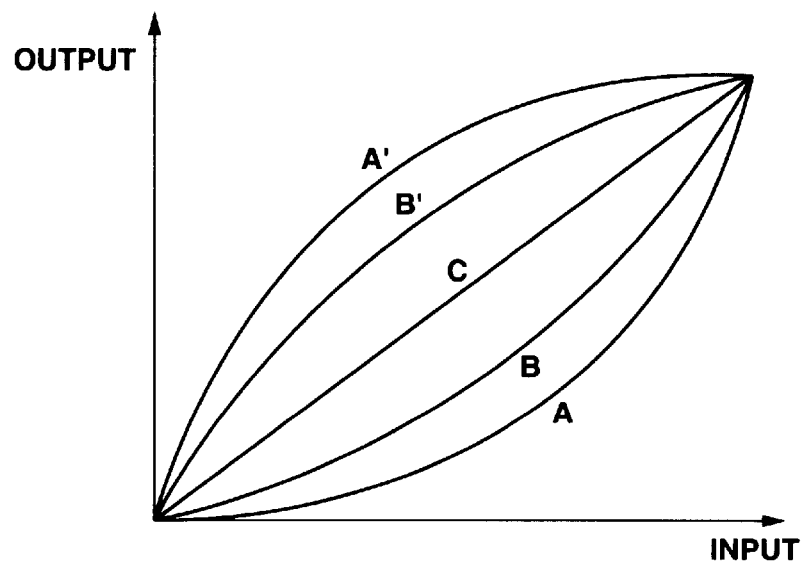
FIG. 12 is a plot of input and output characteristics for describing projector gamma compensation.

The color or brightness of an image projected onto a screen will not become brighter in proportion to the input color or brightness, but will react in a non-linear form. Similarly, human perception sensitivity also reacts non-linearly to increases and decreases in brightness. The compensation done to make such non-linearity close to what is seen by the human eye (or a camera) is called gamma compensation. The gamma characteristics of projectors express the relationship of the output (brightness) of each projector relative to the input signal thereto. Hence the gamma characteristics for two projectors A and B, for example, will be different for each respective projector, as indicated by the symbols A and B in FIG. 12. Thereupon, projection screen images that are the outputs corresponding to the input signals (gamma measurement images) of the respective projectors A and B are captured by the image information capture camera 5, and the gamma characteristics A and B that are the input characteristics are determined by the compensation data calculator 16. Then the reverse gamma characteristics A' and B' for those determined gamma characteristics A and B are calculated. The reverse gamma characteristics A' and B' for the projectors A and B thus calculated are stored as compensation data (compensation table) in the compensation data memory unit 17. With the gamma compensator 26 in the image compensator 13, the reverse gamma characteristics A' and B' are applied to the input images for the projectors A and B, and thereby compensation processing is performed so that the output becomes linear (indicated by the symbol C in FIG. 12) relative to changes in the input signals.

Now, the test images for the geometric deformation measurements, color irregularity and color difference measurements, bias measurements, shading measurements and gamma measurements for each color, for performing the various types of compensation, may be made available individually for each test, as diagrammed in FIG. 5A, 6A to 8 and 11, or they may be suitably combined reducing the number of test images.

As described in the foregoing, in deriving the geometric deformation functions from the correspondence relationship between FIG. 5A and FIG. 5B and effecting geometric compensation, the case is assumed (presupposed) where the projectors are liquid crystal projectors having liquid crystal panels, for example, which are flat-surface light bulbs, and flat images are projected from the liquid crystal projectors to a flat screen. Nevertheless, in cases where the projection screen 4 is of a curved surface shape, such as the arching or dome types diagrammed in FIG. 4A or 4B, respectively, it is not possible to derive the geometric deformation functions as in the case of projecting from a flat light panel to a flat screen. In other words, functions cannot be derived uniformly for determining where markers in the test images will be projected onto a curved screen. In view of that fact, a test image for measuring geometric deformation is considered that is divided into a plurality of small areas.

Figure 13:
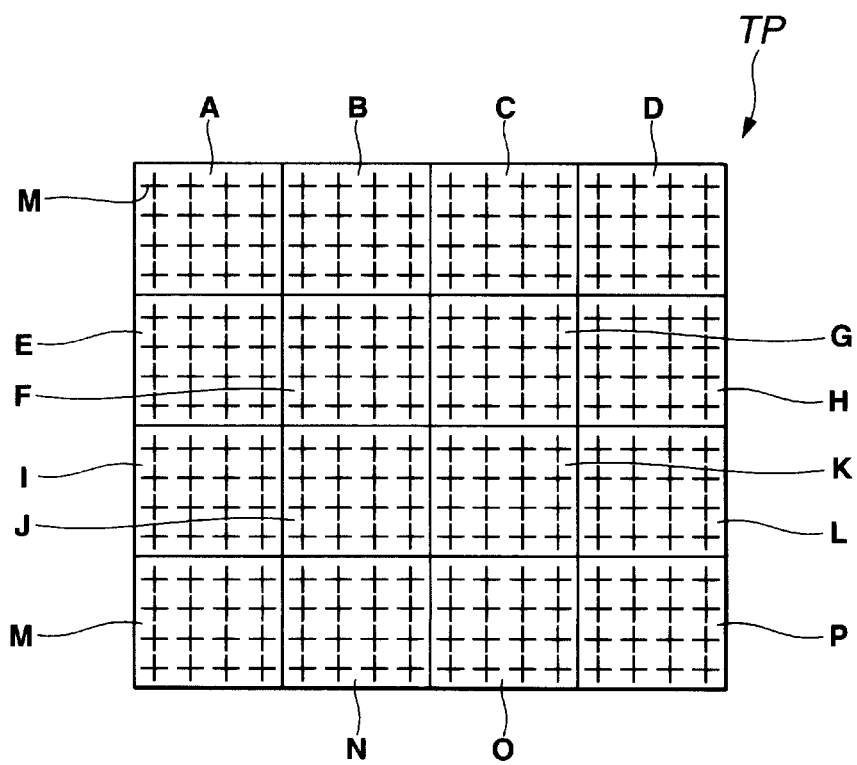
FIG. 13 is a diagram of a geometric distortion measuring test image divided into small areas.

Specifically, a test image TP for measuring geometric deformation is divided into a plurality of small areas A, B, . . . , P, as diagrammed in FIG. 13, each of which small areas A, B, . . . ., P has a plurality of markers (cross-shaped markers in FIG. 13) CSM. From the positions of the markers CSM inside each of the small areas A, B, . . . , P in the test image TP and from the positions of markers CSM in the respective projection areas (those being projection areas corresponding to the small areas A, B, . . ., P), derived are geometric deformation functions which correspond to the respective small areas A, B, . . . , P. That is done so that, when an image such as that diagrammed in FIG. 13 is projected onto a curved screen, the projection areas corresponding to the small areas can be considered to be flat surfaces.

Accordingly, even when projecting from a flat image to a curved screen, a conversion from flat image to flat screen can be approximated by the division of the projected image into small areas. Therefore, geometric deformation functions can be derived for each small area, even when projecting test images on various curved surfaces that, in terms of a curved screen, include surfaces that are simply irregular as well as arching and dome surfaces such as diagrammed in FIGS. 4A and 4B, respectively. Accordingly, it becomes possible to compensate geometric deformation in projected images projected onto any curved surface.

Furthermore, the density of the markers CSM in the test image diagrammed in FIG. 13 may be uniform for all of the small areas A, B, . . . , P, or the marker density may be altered according to the position of the small area on the test image. A change may be effected, for example, so that there are only 8 markers CSM in each of the small areas on the left side but 16 markers in each of the small areas on the right side. In FIG. 13, moreover, the test image is divided into 16 small areas, but it is permissible to make the divisions even finer, in accordance with the degree of deformation or the like in the curved surface, or, conversely, the divisions may be made larger and thus fewer. At the extreme, each small area may be the area occupied by a single pixel.

As to the geometric deformation functions, furthermore, in a case where the inputs to the projectors are flat images and the projection screen is also a flat surface, if a straight line in an input image is projected in a straight line on the screen on the output side, then quadratic projection transformations such as indicated below in formulas (1) and (2) are established between the input and output.

Formula (1)

$$X'=(a0*X+a1*Y+a2)/(a6*X+a7*Y+1.0)$$

Formula (2)

$$Y'=(a3*X+a4*Y+a5)/(a6*X+a7*Y+1.0)$$

Here, X and Y are quadratic projection transformation input coordinates, X' and Y' are quadratic projection transformation output coordinates, and a0, a1, a2, a3, a4, a5, a6, and a7 are quadratic projection transformation coefficients.

Needless to say, in cases where, even though the overall screen is a curved surface, it can be considered to be flat if divided into small areas, the quadratic projection transformations diagrammed in FIG. 14 will hold between input and output for the small areas. That is, whenever the screen areas can be considered to be flat surfaces, the geometric deformation functions for expressing the correspondence relationships between input and output can be expressed by quadratic projection transformations.

Furthermore, in a case where the inputs to the projector are flat images and the projection screen is a curved surface that is already known and can be expressed mathematically, polynomials like those given in Formula (3) and Formula (4) below will be established between the input images and the projected images.

Formula (3)

$$X'=a0*X+a1*X^2+a2*X^3+ \ldots$$

Formula (4)

$$Y'=a0*Y+a1*Y^2+a2*Y^3+ \ldots$$

That is, if accurate information on the projection curved surface (such as the information that it is a cylindrical surface having a radius of 7 m, for example) is known, geometric deformation functions representing the correspondence relationships between input and output can be expressed by polynomials.

In cases where the projected images are divided into small areas, as in FIG. 13, moreover, if the projection screen is a curved surface, then, depending on whether the small areas on the screen corresponding to the small areas in the images can be considered to be flat surfaces or are considered to be curved surfaces, the geometric deformation functions can be represented by quadratic projection transformations, or by polynomials, according to the extent to which divisions are made. Accordingly, in the case of small area division, geometric deformation functions that are different for each small area (being either quadratic projection transformations or polynomials, for example) may be used.

Accordingly, the geometric deformation that occurs when flat images emitted from a flat-surface light bulb such as in a liquid crystal projector are projected onto a curved screen can be effectively compensated. In other words, even when projecting onto any curved surface, by dividing the curved surface into small areas, conversion from flat surface to flat surface can be approximated in each area, wherefore geometric deformation functions will be derived, and compensation can be made.

It should be noted that, when the projection screen 4 is a flat surface, the image information capture camera 5 for capturing the test images projected onto the screen may be deployed so as to squarely face the screen surface, in a position wherefrom the entire screen can be captured. An ordinary flat screen is at most 100 inches in size, wherefore the image information capture camera 5 will be able to capture the entire screen at one time if positioned at a distance of 3 m or so from the screen surface. With an actual arching screen the projection surface whereof is a cylindrical surface, on the other hand, the screen might measure 12 m crosswise and 4 m lengthwise, with a radius of 7 m and an arch angle of 120° (one third of a full circle), for example, and test images will be captured with the image information capture camera 5 placed at the center point (7 m from the screen surface). A camera will generally have an angle of view of no more than 30 degrees or so, wherefore, to capture 120°, the camera 5, left in place at the center point, will be turned five times to make the capture. That is because, in order to capture the overall screen with the camera, the camera position will have to be made further distant from the center point, and there will be limits to how much further the camera can be distanced indoors. In other words, in capturing test images with the image information capture unit 5 when the projection screen 4 is an arching screen, for example, irrespective of the projection ranges to a projection screen 5 of a plurality of projectors, the capturing is done by making divisions within the range of capability of the test image capturing camera 5.

When projected test images are captured, the test images will be projected over the entire surface of a laterally long arching screen, wherefore the image information capture camera 5 will be turned through a certain angle (an angle near 30°) to do the capturing divided between a plural number of times so that there will be overlaps. Then the overall image of the test images is obtained by connecting together the plurality of images captured divisionally.

There are also cases where it will be necessary to perform divisional capturing, moving the camera 5 horizontally and vertically, not only for a curved screen such as an arching screen, but also for a large flat screen exceeding 100 inches in size.

Next, a description is given of a method for connecting together divisionally captured test images into one image.

In FIG. 14 is diagrammed a case where, to simplify the description, an arching screen having an arch angle of approximately 60° is used as the projection screen 4, the image information capture camera 5 is positioned at the center point and the capturing of the projected images is divided between two captures. First, capturing is done over the range indicated by the solid lines, and next capturing is done by turning to the range indicated by the dotted chain lines.

At such time, when dividing the capturing of images projected onto the arching screen by the camera 5 between two captures, because the image-sensing surface of the image sensor (CCD) in the camera 5 is a flat surface even though the images are on the curved surface on the arching screen, these are captured in the camera 5 as two flat images (indicated by the double-dotted chain lines V1 and V2). As a consequence, the two images V1 and V2 captured in two divided captures will not be particularly smoothly connected in the overlapping portion. Thereupon, when the screen is an arching surface (cylindrical surface), the multiple images V1 and V2 that were divisionally captured are subjected, respectively, to processing called cylindrical transformation to projection-transform them to a cylindrical surface, and then joined together, thereby making it possible to obtain an overall image of test images that are smoothly connected.

In the case of a dome screen, similarly, when an image projected on the dome screen is divisionally captured by the camera 5, it is captured in the camera 5 as a plurality of flat images even though the divided images are images on the curved surface of the dome screen. As a consequence, when these are joined together as they are, they are not particularly smoothly joined at overlapping portions. Thereupon, when the screen is a dome surface (spherical surface), the multiple images that were divisionally captured are subjected, respectively, to processing called spherical surface transformation to perform projection-transformation, that is, to transform each image to be projected to a spherical surface, and then joined together, thereby making it possible to obtain an overall image of test images that are smoothly connected.

Not only with arching, dome, or flat screens, but also when the screen is large, test images cannot be captured at one time with the capturing camera 5. With an arching or dome screen, the camera 5 is placed at the center point of that cylindrical or spherical surface and capturing is done while turning the camera 5 repeatedly through the required angle. With a large flat screen, similarly, it is also conceivable that capturing be done by deploying the camera 5 at one location and then turning the camera 5, but then the captured images will be distorted, wherefore there are also cases where capturing is done while moving the camera 5 a plural number of times either horizontally or vertically. In cases where the image information capture unit 5 such as a test image capturing camera or the like is turned or moved to perform divisional capturing, positional information as to from what position capturing is currently being done is displayed on a position display unit 41, and, while referencing that, divisional capturing is performed while turning the camera next through the necessary angle or moving it the necessary distance. The display function afforded by this position display unit 41 is particularly useful in cases where the camera 5 is turned or moved manually, but it is also useful in the sense of verifying the camera position during capturing in cases where capturing is done while turning or moving the camera 5 automatically with the position thereof under the control of a PC 42 (according to a predetermined program). That is, by displaying the position (turning angle, or horizontal and vertical moving distance) of the image information capture unit, the image information capture unit can be turned or moved while its position is being verified, and an indication of a position to move to can be given to the user. When the camera position is controlled automatically, of course, there need be no position display unit 41, or, alternatively, the positional display by the position display unit 41 may be left unused.

Next, a description is given for the removal of the external light information which is considered to be necessary when capturing test images, as a precondition for producing data for compensating color irregularity and/or brightness irregularity by capturing test images.

In order to eliminate the influence of external light when capturing test images, it is necessary to project and capture the test images in conditions that are completely the same as a dark room. If the screen is small, actual dark room conditions can be realized, but that becomes difficult with a large screen. Accordingly, before projecting the test images, external light information is obtained by capturing the screen surface, by the image information capture camera 5, while no test images are being projected onto it, and then, when next the test images are projected and captured with the image information capture camera 5, the external light information is subtracted from the test image capture images, thereby effecting external light compensation.

FIG. 15 is a block diagram of an image projection display apparatus in another embodiment aspect of the present invention. Parts that are the same as in FIG. 1 are designated by the same symbols and not further described.

What is different from FIG. 1 in FIG. 15 is that, to the configuration diagrammed in FIG. 1, an external light information memory unit 51 and external light compensator 52 have been added. In other respects the configuration is the same as in FIG. 1.

Before projecting the test images onto the projection screen 4, external light information for positions on the projection screen where the test images are to be projected are captured by the image capturing camera 5, and that external light information is stored in the external light information memory unit 51. Next, the test images are projected onto the projection screen 4, test image information is captured by the image capturing camera 5, and the captured test image information is compensated by the external light compensator 52 using the external light information stored in the external light information memory unit 51. For the test images, there are images for various types of measurement, such as those diagrammed in FIG. 5A, 6A, to 8 and 11. The external light compensated test image information is sent to the compensation data calculator 16, and there compensation data are calculated for compensating the output characteristics corresponding to the content of the test images for the projectors. The compensation data are stored in the compensation data memory unit 17. In the image compensator 13, the input image data corresponding to the projectors from the input image divider 12 are subjected to necessary compensation using the compensation data stored in the compensation data memory unit 17, and sent to the projectors 3a to 3d. The configuration of the image compensator 13 is the same as that indicated in FIG. 2.

Accordingly, by removing the external light components that have ill effects when producing the compensation data, test image information from which the external light components have been eliminated can be acquired, and, as a result, accurate compensation data can be produced.

In the description thus far, it has been presupposed that the image capturing camera 5 is deployed directly in front of the projection screen 4, that is, that the capturing is done at right angles to and centered on the projection screen 4. However, in cases where the camera 5 is not deployed directly in front of the projection screen 4, it is necessary to make compensation so that images can be obtained as though they were captured from directly in front. One example of such a compensation method is described next, with reference to FIG. 16.

In FIG. 16, markers ML such as LEDs (light emitting diodes) are deployed about the periphery of the projection screen 4, or at the outer frame of the screen 4, in such manner that they can be lit when capturing test images by the image capturing camera 5.

The markers indicated here differ from the markers M (the positions of markers in projected images changing according to the positions where the projectors 3a and 3d are placed) in the test image TP diagrammed in FIGS. 5A and 13, these being markers by which to ascertain screen positions. The markers ML on the screen captured by the camera 5 change according to the position where the camera 5 is placed. That is, these markers are for the purpose of acquiring information as to where the camera 5 is performing capturing.

Next, using the flowchart given in FIG. 17, a description is given of a method that references the markers on the screen in compensating test images that have been projected with a geometric deformation based on a shift in the position of the image capturing camera, as diagrammed in FIG. 16.

First, in step (hereinafter abbreviated S) 1, the camera is deployed at a suitable position relative to the screen. Next, after capturing a test image (S2), at the same position, a marker ML at the periphery of the screen is captured (S3). Alternatively, steps S2 and S3 may be combined, and both the test image and the marker ML may be captured simultaneously with a single capture. Then, marker position coordinates are detected from the captured marker ML image (S4), and a projection transformation function is derived from the correspondence relationship between the marker position coordinates detected from the captured image and the physical position of the marker ML on the screen (S5). Then the test image is geometrically compensated using the inverse function of the projection transformation function that was derived (S6). That inverse function is stored in memory as compensation data, and used in applying compensations to input image data when outputting ordinary input images to a projector.

FIG. 18 is a diagram for describing the compensation method noted above.

When, for example, test images are captured with the image capturing camera 5 placed at a position which is diagonally shifted from directly in front of the projection screen 4, a captured image that is supposed to be rectangular will be captured geometrically deformed into a trapezoidal shape as indicated by the symbol A1 in FIG. 18. This captured image is sent to the compensation data calculator 16, an inverse deformation function image like that indicated by the symbol A2 is derived as compensation data, and those compensation data are stored in the compensation data memory unit 17. Then, in the image compensator 13, the input image data corresponding to the projectors from the input image divider 12 are subjected to compensation using the compensation data stored in the compensation data memory unit 17 and sent to the projectors 3a to 3d. Thereby, in cases where capturing is done with the camera position shifted away from directly in front, compensating deformation can be done to effect images that appear to have been captured from directly in front in the projection area of the screen noted earlier. Thus, as in the case of removing the external light components, it is possible to calculate, with high precision, compensation data necessary to compensate for geometric distortion, color irregularity, and shading in projectors, as well as inter-projector color differences and the like.

It is important that the external light compensation and compensation of geometric deformation caused by a shift in camera position described in the foregoing with FIGS. 15 to 18 be done at a stage prior to that of compensating projector position or distortion in projector output characteristics. That is, in order to obtain data for correcting projector-related image distortion, it is necessary first to eliminate distortion factors involving the image capturing camera 5 or external light or other factors.

As based on the image projection display apparatus and projected image compensation apparatus of the present invention, as described in the foregoing, when using a plurality of projectors to effect a seamless large picture screen, it is possible more accurately to make compensations for geometric distortion, color irregularities, and shading in projected images, though the projection screen be a surface exhibiting any shape whatever, and projected images that are highly detailed and of high picture quality can be realized.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image projection display apparatus having:
    a plurality of projectors;
    a projection screen functioning as an image-formation surface for projected images of said plurality of projectors, having mutually overlapping areas;
    a test image memory unit for storing predetermined test images;
    an image capture unit for capturing projected test images resulting from projecting said predetermined test images by said respective projectors onto said projection screen;
    a compensation data calculator for calculating, based on said captured projected test image, compensation data for correcting output characteristics of said respective projectors;
    a compensation data memory unit for storing said compensation data;
    an input image divider for dividing input images in correspondence with said respective projectors; and an image compensator for subjecting said input images input to corresponding projectors to compensations, using output characteristic compensation data for said respective projectors wherein, in said image capture unit, when projected test images are captured, capturing is performed, divided into a plural number of captures, so that overlapping occurs, and overall image of test images is obtained by joining together multiple images divisionally captured.

2. The image projection display apparatus according to claim 1, wherein, when the projection screen is a cylindrical surface, an overall image of test images is obtained by joining together multiple images divisionally captured after said images have been subjected to cylindrical transformation.

3. The image projection display apparatus according to claim 1, wherein, when the projection screen is a spherical surface, overall image of test images is obtained by joining together multiple images divisionally captured after said images have been subjected to spherical surface transformation.

4. The image projection display apparatus according to claim 1, further having a display unit for displaying a position of said image information capture unit, inclusive of turning angle or horizontal and vertical movement distance,
    wherein divisional capture is performed, turning or moving said image information capture unit with reference to those position data.

5. The image projection display apparatus according to claim 1, wherein divisional capture is performed while automatically controlling position of said image capture unit, inclusive of turning angle or horizontal and vertical movement distance.

6. An image projection display apparatus having:
    a plurality of projectors;
    a projection screen functioning as an image-formation surface for projected images of said plurality of projectors, having mutually overlapping areas;
    a test image memory unit for storing predetermined test images in which tone levels are an intermediate level;
    an image capture unit for capturing projected test images resulting from projecting said predetermined test images by said respective projectors onto said projection screen;
    a compensation data calculator for calculating, based on said captured projected test image, compensation data for performing compensation for shading of the images projected onto said projection screen;
    a compensation data memory unit for storing said compensation data;
    an input image divider for dividing input images in correspondence with said respective projectors; and
    an image compensator for subjecting said input images input to corresponding projectors to said compensations for shading, using said compensation data for said compensation for shading for said respective projectors.

7. An image projection display apparatus having:

a plurality of projectors;

a projection screen functioning as an image-formation surface for projected images of said plurality of projectors, having mutually overlapping areas;

a test image memory unit for storing predetermined test images, said test images being divided into a plurality of small areas in accordance with a degree of deformation in a curved surface of said projection screen, each of said small areas having a plurality of markers;

an image capture unit for capturing projected test images resulting from projecting said predetermined test images by said respective projectors onto said projection screen;

a compensation data calculator for calculating, based on said captured projected test image, compensation data for compensating geometric deformation of the images projected onto said projection screen for each of said small areas;

a compensation data memory unit for storing said compensation data;

an input image divider for dividing input images in correspondence with said respective projectors; and an image compensator for subjecting said input images to input to corresponding projectors to said compensations of geometric deformation, using said compensation data for said compensation of geometric deformation for said respective, projectors.

8. An image projection display apparatus according to claim 7, wherein said compensation data calculator calculates said compensation data using a geometric deformation function represented by polynomials in accordance with the degree of deformation of said curved surface of said projection screen.

9. An image projection display apparatus having:

a plurality of projectors;

a projection screen functioning as an image-formation surface for projected images of said plurality of projectors, having mutually overlapping areas;

a test image memory unit for storing predetermined test images, said test images being divided into a plurality of small areas, each of said small areas having a plurality of markers;

an image capture unit for capturing projected test images resulting from projecting said predetermined test images by said respective projectors onto said projection screen;

a compensation data calculator for calculating, based on said captured projected test image, compensation data for compensating geometric deformation of the images projected onto said projection screen for each of said small areas using a geometric deformation function represented by quadratic projection transformations or polynomials;

a compensation data memory unit for storing said compensation data;

an input image divider for dividing input images in correspondence with said respective projectors; and an image compensator for subjecting said input images to input to corresponding projectors to said compensations of geometric deformation, using said compensation data for said compensation of geometric deformation for said respective projectors.

* * * * *